(12) United States Patent
Gritter (10) Patent No.: US 7,778,053 B2
(45) Date of Patent: *Aug. 17, 2010

(54) POWER SYSTEM HAVING A VOLTAGE REGULATOR WITH A NOTCH FILTER

(75) Inventor: David J. Gritter, Wauwatosa, WI (US)

(73) Assignee: American Superconductor Corp., Devens, MA (US)

( * ) Notice: Subject to any disclaimer, the term of this patent is extended or adjusted under 35 U.S.C. 154(b) by 221 days.

This patent is subject to a terminal disclaimer.

(21) Appl. No.: 11/352,946

(22) Filed: Feb. 13, 2006

(65) Prior Publication Data

US 2007/0189045 A1    Aug. 16, 2007

(51) Int. Cl.
*H02M 7/5395* (2006.01)
(52) U.S. Cl. .................. 363/42; 307/105; 327/556
(58) Field of Classification Search .............. 363/42, 363/48, 40, 41; 307/105, 44; 323/207; 327/556
See application file for complete search history.

(56) References Cited

U.S. PATENT DOCUMENTS

| | | | |
|---|---|---|---|
| 4,480,301 A * | 10/1984 | Pfaff et al. ............ | 363/137 |
| 5,329,221 A | 7/1994 | Schauder | |
| 5,384,696 A | 1/1995 | Moran et al. | |
| 5,428,283 A | 6/1995 | Kalman et al. | |
| 5,642,003 A | 6/1997 | Edwards et al. | |
| 5,734,257 A | 3/1998 | Schauder et al. | |
| 5,757,099 A * | 5/1998 | Cheng et al. .......... | 307/105 |
| 5,883,796 A | 3/1999 | Cheng et al. | |
| 6,201,715 B1 | 3/2001 | Huggett et al. | |
| 6,559,618 B1 * | 5/2003 | Consoli et al. ........ | 318/727 |
| 6,977,827 B2 | 12/2005 | Gritter | |

OTHER PUBLICATIONS

George Ellis, Control System Design Guide, 2000, Academic Press, second edition, pp. 178-179 and 186-187.*
Min Dai, A PWM Rectifier Control Technique for Three-Phase double Conversion UPS under Unbalanced Load, Mar. 6, 2005, APEC, vol. 1, pp. 548-552.*
Emmanuel Ifeachor, Digital Signal Processing A Practical Approach, 1996, Addison-Wesley Publishing Co., pp. 252-253.*
Self-tuning Notch Filter, Apr. 1, 1984, IBM Technical Disclosure Bulleting, Apr. 1984, US, vol. 26, Issue 11, pp. 6148-6149, Cross Reference 0018-8689-26-11-6148.*

(Continued)

*Primary Examiner*—Harry Behm
(74) *Attorney, Agent, or Firm*—Daly, Crowley, Mofford & Durkee, LLP (57) ABSTRACT

A control system for an AC line voltage distribution system includes a DC energy storage system and an inverter coupled to the DC energy storage system adapted for coupling to the AC line distribution system. A proportional-integral voltage regulator coupled to the DC energy storage system receives a voltage signal for the DC energy storage system and receives a voltage reference. In an exemplary embodiment, the voltage regulator includes a proportional path and an integral path to receive the DC voltage information and the voltage reference signal information, a filter to remove an AC component having a predetermined frequency contained in the DC voltage signal, and an output terminal to output a control signal with the AC component removed.

19 Claims, 10 Drawing Sheets

OTHER PUBLICATIONS

Yongsug Suh, Valentin Tijeras and Thomas A. Lipo, A Nonlinear Control of the Instantaneous Power in dq Synchronous Frame for PWM AC/DC Converter under Generalized Unbalanced Operating Conditions, pp. 1-8, IEEE 2002.

Xiaoming Yuan, Jost Allmeling, Willi Merk, and Hebert Stemmler, Stationery Frame Generallzed Integraters for Current Control of Active Power Filters with Zero Steady State Error for Current Harmonics of Concern under Unbalanced and Distorted Operation Conditions, pp. 1-8, Power Electronics and Eletrometrology Laboratory, Swiss Federal Institute of Technology Zurich, Zurich, Switzerland, 2000.

* cited by examiner

FIG. 1

|  |  |

FIG. 2

|  |  |

POWER SYSTEM HAVING A VOLTAGE REGULATOR WITH A NOTCH FILTER

CROSS-REFERENCE TO RELATED APPLICATIONS

Not Applicable.

STATEMENT REGARDING FEDERALLY SPONSORED RESEARCH

Not Applicable.

BACKGROUND

Power line conditioning systems for monitoring the quality of an AC line voltage and restoring an unsatisfactory line voltage to within a specified voltage range are known. There are various causes for a line voltage to be outside of its specified range. For example, a line-to-ground fault on one phase can cause the line-to-line voltages to become unequal.

Another power line quality problem is the presence of harmonic disturbances on the line, as can be caused by non-linear loads. Such harmonic disturbances take the form of AC currents on the power line at frequencies other than the nominal line frequency of 60 Hz.

In one type of conventional power line conditioning system, sometimes referred to as an active VAR (volt-ampere reactive) generator, reactive energy is injected into or withdrawn from the line to restore the line voltage to the desired level. Specifically, if it is determined that the line voltage is too high, then an inductive current is injected into the line to lower the line voltage; whereas, if the line voltage is too low, then a capacitive current is injected to raise the line voltage. Active VAR generators include an inverter connected between the transmission line and a DC energy storage device, such as a battery, DC bus capacitor, or other energy storage device used to provide power to the inverter. The inverter is controlled to produce a reactive current waveform that is injected into or withdrawn from the transmission line to restore the line voltage to the desired condition.

Various control techniques are possible for an active VAR generator in order to determine the appropriate amount of reactive energy to inject into or withdraw from the line. In accordance with one such technique, voltage amplitudes are sampled on a phase-by-phase basis and used to determine the necessary current to restore the voltage to the desired level. However, such a phase-by-phase analysis of the line voltage may result in an injected current demand that exceeds the system capacity or is ineffective in restoring voltage balance, since this type of analysis ignores interaction between the phases.

Another control technique for determining the current levels necessary to restore the line voltage to the desired level includes analyzing the sequence components of the line voltage and is sometimes referred to as phase sequence separation or simply, sequence separation. Unbalanced voltage lines can be represented as the sum of a forward and backward rotating vector of fixed magnitude and frequency. The forward rotating vector is referred to as the positive sequence component and the backward rotating vector is referred to as the negative sequence component. In order to address an unbalanced line condition, it is desirable to bring the negative sequence component to zero and to bring the positive sequence component to within some small percentage of a predetermined value.

One type of sequence separation utilizes synchronous reference frame control in which measured three-phase voltages or currents are transformed into synchronously rotating D axis and Q axis reference frame quantities. The D-Q reference frame quantities are used to generate inverter control signals that are transformed back to three-phase static reference frame quantities for use by the inverter. For example, in an active VAR generator utilizing synchronous reference frame control, each phase of a three-phase line is sampled and the three-phase quantities are transformed into stationary two-phase X-Y axis reference frame quantities. The stationary X-Y reference frame quantities are transformed into synchronously rotating two-phase quantities and proportional-integral (PI) control is used to control the currents to be injected into, or withdrawn from the line. The rotating D-Q voltage references, which are the output of the PI controllers, are transformed back to a static three-phase reference frame to generate the control signals for the inverter of the active VAR generator. A phase locked loop (PLL) is used to lock the rotating reference frame to the positive sequence component of the monitored line voltage, so that current is injected into the line or withdrawn from the line with the correct phase. Low pass filters are used to filter the second harmonic component attributable to the sequence component of opposite polarity. However, a tradeoff exists between the speed of response and elimination of the second harmonic components, since low pass filters result in significant response delays.

SUMMARY

In one aspect of the invention, a voltage regulator device comprises a first input terminal to receive a voltage signal for a DC bus and a second input terminal to receive a DC bus voltage reference signal. The device includes a proportional path and an integral path to receive the DC bus voltage information and the voltage reference signal information, and a filter to remove an AC component having a predetermined frequency contained in the DC bus voltage signal. The device further includes an output terminal to output a control signal with the AC component removed.

In one particular embodiment, the filter is a notch filter tuned to about 120 Hz that can be implemented as part of a phase locked loop. A tuning parameter for the notch filter can be derived from a frequency estimate of a phase locked loop locked to a positive sequence component of line voltage.

The device can further include a current regulator to receive the control signal. In one embodiment, an inverter and a DC energy storage system coupled to the DC bus. A rectangular to polar converter and a space vector generator can be used to generate gate signals to control the inverter.

In another aspect of the invention, a control system for an AC line voltage distribution system comprises a DC energy storage system, and an inverter coupled to the DC energy storage system and adapted for coupling to the AC line distribution system, a modulator to provide control signals to the inverter, and a proportional-integral voltage regulator coupled to the DC energy storage system for receiving a voltage signal from the DC energy storage system and adapted for coupling to a voltage reference. In one embodiment, the voltage regulator includes a proportional path and an integral path to receive the DC voltage information and the voltage reference signal information, a filter to remove an AC component having a predetermined frequency contained in the DC voltage signal, and an output terminal to output a control signal with the AC component removed. In one embodiment, a tuning parameter for the notch filter is derived from a frequency estimate of a phase locked loop locked to a positive sequence component of line voltage.

In a further aspect of the invention, a method comprises receiving a voltage on a DC bus, receiving a reference voltage, processing the DC bus voltage and the reference voltage in a proportional path of a voltage regulator, processing the DC bus voltage and the reference voltage in an integral path of the voltage regulator, and combining an output of the proportional path and an output of the integral path and removing an ac component having a certain frequency from the combined proportional path output and the integral path output. The method further includes generating an output control signal with the ac component removed.

In another aspect of the invention, a regulator system comprises a voltage regulator to receive a voltage signal from a DC bus and a DC bus reference signal and to output a control signal based upon the DC bus voltage signal and the DC bus reference signal, and a notch filter to receive the control signal and remove an AC component having a predetermined frequency contained in the DC bus voltage signal.

In one embodiment, the notch filter is implemented as part of a phase locked loop and a tuning parameter for the notch filter is derived from a frequency estimate of a phase locked loop locked to a positive sequence component of line voltage. The AC component can be due to an unbalanced line voltage in an AC line voltage distribution system. A current regulator can receive the filtered control signal and an inverter and a DC energy storage system can be coupled to the DC bus.

BRIEF DESCRIPTION OF THE DRAWINGS

The foregoing features of this invention, as well as the invention itself may be more fully understood from the following description of the drawings in which.

DETAILED DESCRIPTION

Figure 1:
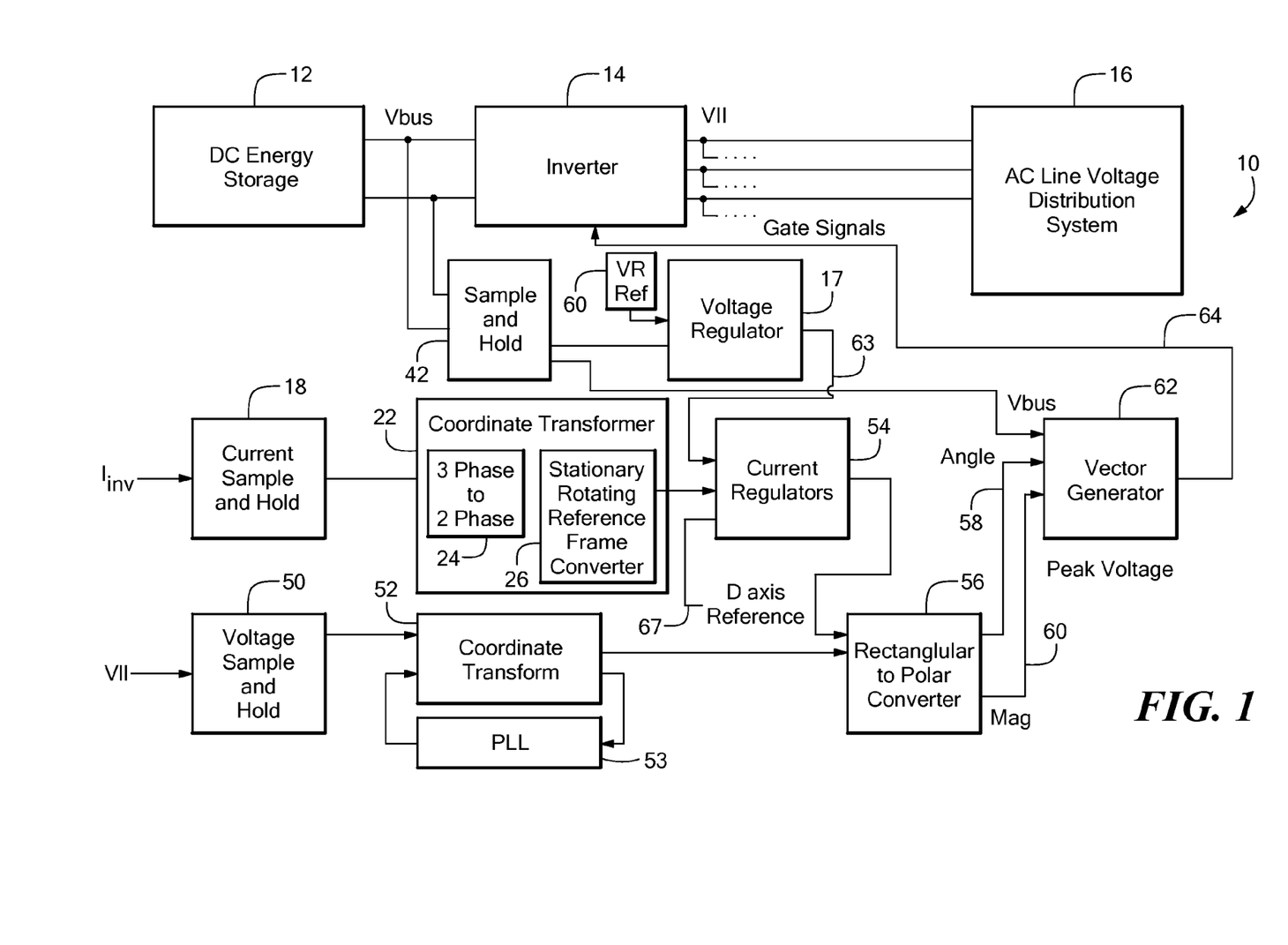
FIG. 1 is a block diagram of a power system having a voltage regulator that eliminates sequence components in accordance with embodiments of the invention.

FIG. 1 shows an exemplary power system 10 including an inverter 14 coupled between a DC energy storage means 12, such as a battery, DC bus capacitors or other energy storage means, and an AC line voltage distribution system 16. In general, the system 10 includes a voltage regulator 17 that eliminates certain sequence components from the regulator output signal to enhance overall system performance, as described in detail below.

A sample and hold circuit 18 samples the inverter current and provides digitized current information to a three phase to synchronous reference frame converter 22. Exemplary architectures and techniques for performing three phase to synchronous reference frame coordinates and generating D and Q components locked to a positive sequence component are shown and described in U.S. Pat. No. 6,977,827 to Gritter, which is incorporated herein by reference. In general, the converter 22 includes a three phase to two phase transformation processor or simply, transformer 24 for transforming the sampled three phase quantities into two phase, x and y axis quantities. The output of the transformation processor 24 is coupled to the stationary to rotating reference frame converter 26, which converts from the stationary x, y coordinates to a D, Q coordinate system with the components locked to the phase of positive sequence.

As will be apparent to those of ordinary skill in the art, the three phase to synchronous reference frame converter 22 makes no distinction between positive sequence and negative sequence components of current. A rotation into a reference frame synchronized to the positive sequence voltage represents the positive sequence components of current as DC quantities, but negative sequence components as sinusoidal quantities at twice the frequency at which the reference frame is rotating.

A second sample and hold circuit 42 samples the DC bus voltage Vbus, as shown, and provides the voltage information to the voltage regulator 17. The voltage regulator 17 provides control signals to a current regulator module 54, as described more fully below.

A third sample and hold circuit 50 samples the line voltage Vll (V line to line) and provides digitized voltage information to a further coordinate transformer 52, which can be similar to current coordinate transformer 22. A phase locked loop 53 is responsive to a D axis positive sequence component for generating a synchronous reference frame angle signal 49.

The coordinate transformer 22 for the inverter current provides transformed D and Q coordinate current signals (e.g., current sequence components) Iq, Id, to a current regulator module 54, which can be provided as PI (proportional-integral) regulators. A rectangular to polar conversion module 56 adds together the voltage component signals from the voltage coordinate transformer 52 and voltage correction signals from the regulators 54 and outputs an angle signal 58 and a magnitude signal 60 to a vector generator module 62, which provides gate signals 64 to control the inverter.

In general, commanding Q axis current into the inverter 14 causes power flow into the DC bus to raise the DC bus voltage. Commanding D axis current produces no net power flow, but produces reactive AC currents. External line voltage must command capacitive reactive current to raise the line voltage. To this end, a Q axis current reference 63 comes from an internal DC bus voltage regulator and D axis references 67 come from a DVAR system controller external to the inverter controls. If voltage at the terminals causes an in phase flow of current into the inverter 14, then the inverter looks to the line like a resistor, and therefore must be seen to be absorbing power. Similarly, reactive current into the inverter 14 makes the inverter look like an inductor, and thus reduces the line voltage in quadrature with it, because the line's impedance is primarily inductive, thereby establishing a voltage divider. Reactive current out of the inverter makes the inverter look like a capacitor.

Figure 2:
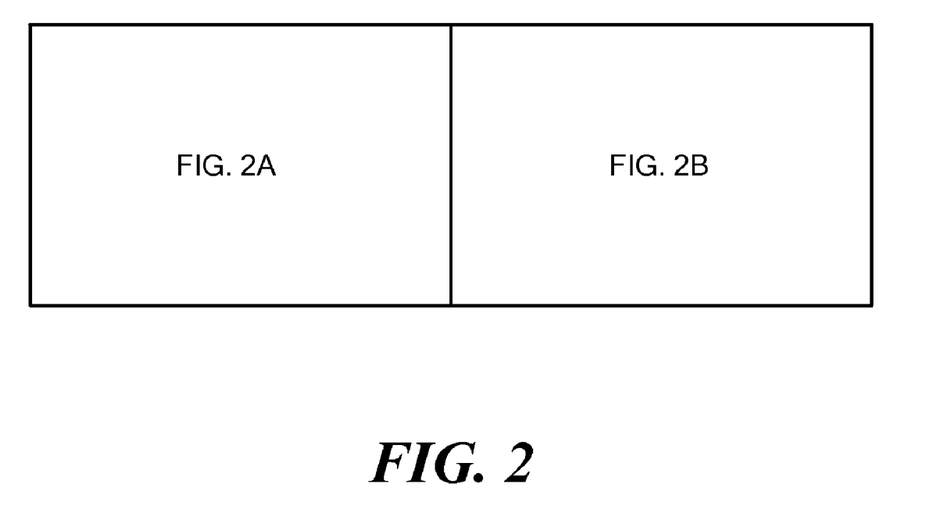
FIG. 2 is a block diagram showing further details of the system of FIG. 1.
Figure 2A:
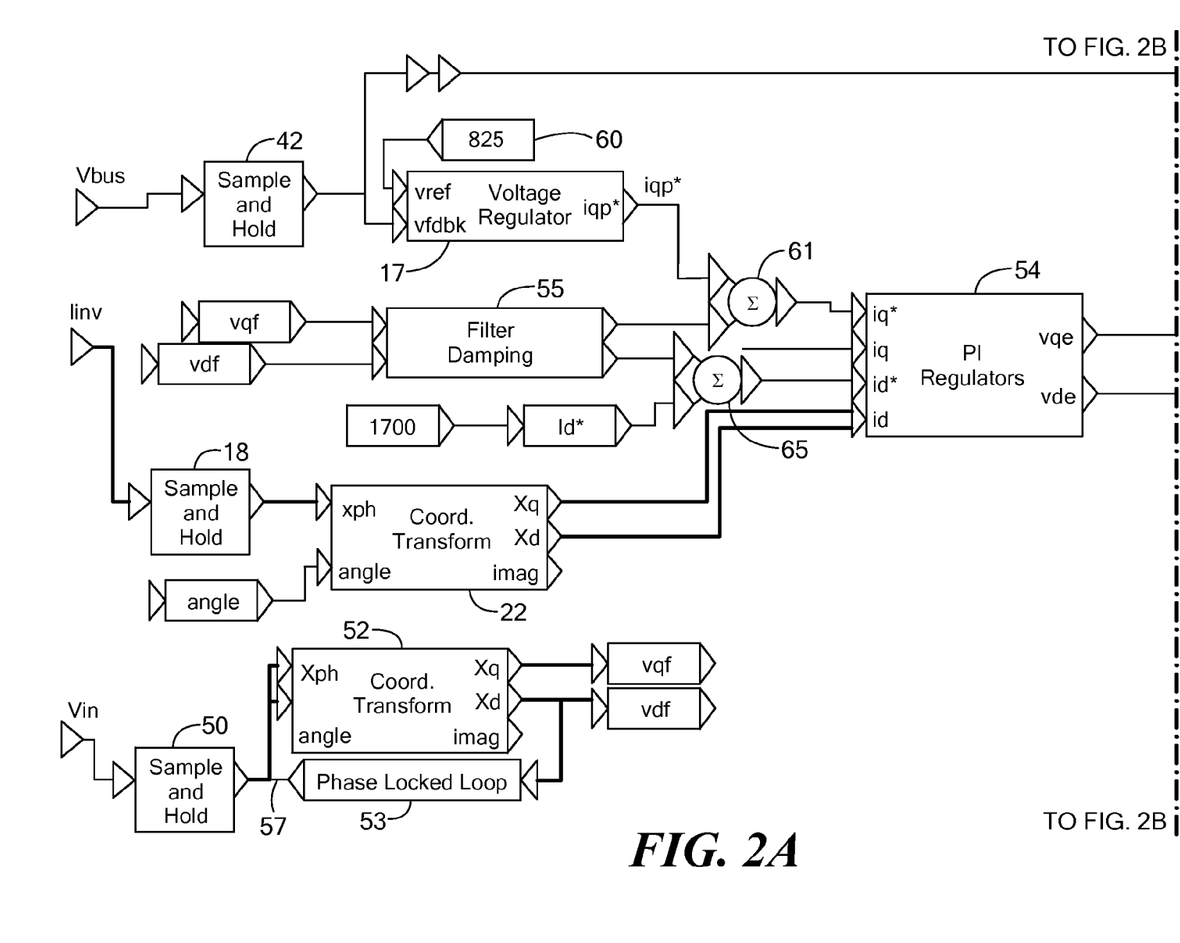
Figure 2B:
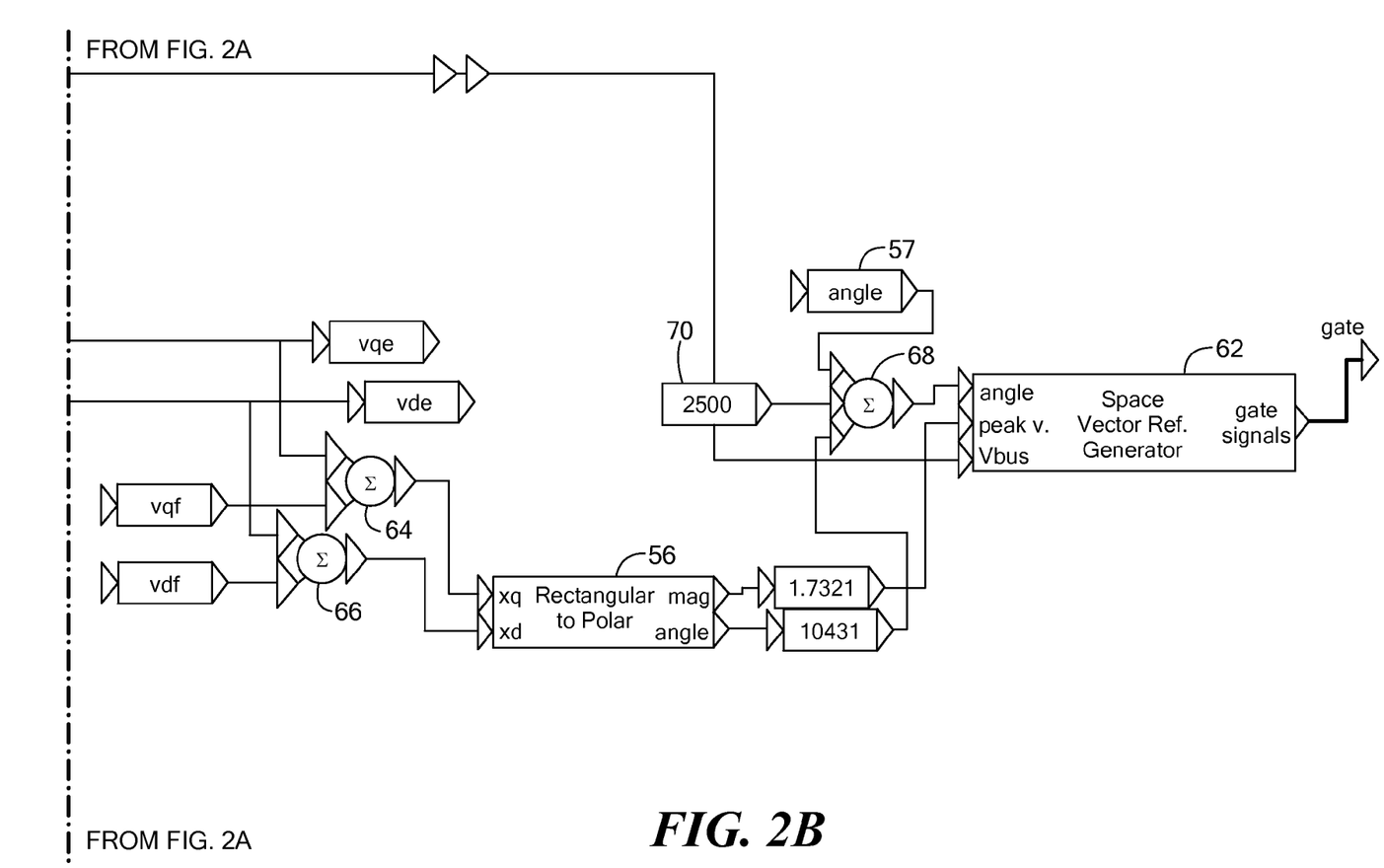

FIG. 2 shows further details for the system of FIG. 1 in which like reference numbers indicate like elements. The voltage regulator 17 receives digitized DC bus voltage Vbus information from the sample and hold circuit 42 and a reference voltage 60, shown here as 825V. The DC bus feedback signal Vbus contains in a steady state an 825V DC component with about a 50V peak to peak 120 Hz ac component when operating into an unbalanced line. The voltage regulator 17 outputs a control signal Iqp* signal for use by the regulator module 54. More particularly, the Iqp* signal provides a current reference or command signal indicative of the Q axis positive sequence component current necessary to maintain the DC bus voltage at the reference voltage 60.

The voltage coordinate transformer 52, which is coupled to a phase locked loop 53 with a notch filter, provides voltage sequence components vqf, vdf. In an exemplary embodiment, these voltage sequence components are provided as inputs for a filter damping module 55. The damped vqf component is coupled to a negative input of a summer 61 and the Iqp* signal from the voltage regulator 17 is provided to a positive input of the summer 61. The summer 61 output is coupled to an Iq* input of the PI regulator module 54.

In general, the current and voltage sequence components are converted to the synchronous reference frame, regulated by PI regulators to generate voltage and current reference, or command signals that are used to generate a PWM (pulse width modulation) signal for controlling the inverter. It is understood that other formats can be used to generate signals for inverter control such as a phase control signal for a cycloconverter, or resonant switch timing signals for a resonant DC converter. It will be appreciated by those of ordinary skill in the art that whereas, here, the processed signals are converted back to three phase stationary quantities for inverter control signal generation, it is possible to perform the regulation function in the synchronous reference frame.

More particularly, the sampled line voltage is processed by the three phase to synchronous reference frame converter 52 to provide positive Q and D axis rotating sequence component voltages, Vqf and Vdf. Converter 52 includes a PLL 53 with a notch filter that generates a synchronous reference frame angle signal 57 for use in the stationary to rotating reference frame conversion.

The sampled three phase inverter current is likewise transformed into a synchronously rotating reference frame by a three phase to two phase transformer 24 (FIG. 1) and a stationary to rotating reference frame converter 26 (FIG. 1). The current sequence components from converter 22 Iq, Id are coupled to the current regulator module 54, as shown. Also coupled to the current regulator module 54 is a current reference signal −Iqp* generated by the voltage regulator 17, which is responsive to the DC bus voltage Vbus and an external current command Id* which in this instance is set for 1700 amps. This signal regulates the Vbus voltage to a desired level set by reference voltage 60, which is shown as 825V. The current regulator module 54 contains a Q axis regulator and a D axis regulator and generates Q and D axis correction voltages Vqe and Vde, respectively. Correction voltages Vqe and Vde are summed with the Q and D axis voltages Vqf and Vdf, respectively, to provide the voltages to be applied to the inverter in order to inject the appropriate level of current into the DC bus. The feedforward of these voltages allows the current regulators 54 to calculate only the correction voltage needed to get the actual current to follow its reference, here of 1700 amps. Thus, the outputs of current regulators 54 are correction voltages, Vqe and Vde, in the synchronous reference frame that add or subtract slightly from the steady state feed forward value. Exemplary regulator implementations are shown and described in detail in the '827 patent to Gritter.

In the illustrated embodiment, the Q axis signals Vqf and Vqe are summed by a summer 64 and the D axis signals Vdf and Vde are summed by a summer 66 to generate reference voltages input to the rectangular to polar converter 56, which converts the reference voltages into magnitude and angle/phase. The space vector reference generator 62 accepts magnitude and phase and adds the phase to the reference frame angle 57 in a summer 68 to define the voltage vector that the inverter should generate. The space vector generator 62 generates a PWM pulse train as gate signals to drive the inverter switches to produce the desired voltage vector in the stationary reference frame. In other words, the output of the rectangular to polar converter 56 gives the magnitude and phase of the desired voltage in a synchronous reference frame. Adding the reference frame angle to the reference voltage tells the space vector reference generator 62 what magnitude and angle to generate in a stationary reference frame.

In one embodiment, the vdf component is also coupled to the filter damping module 55 and the damped vdf component is coupled to the negative input of a summer 65. A current reference Id* signal is coupled to a positive input of the summer 65 and the summer output is provided as an Id* input to the regulator module 54.

Figure 3:
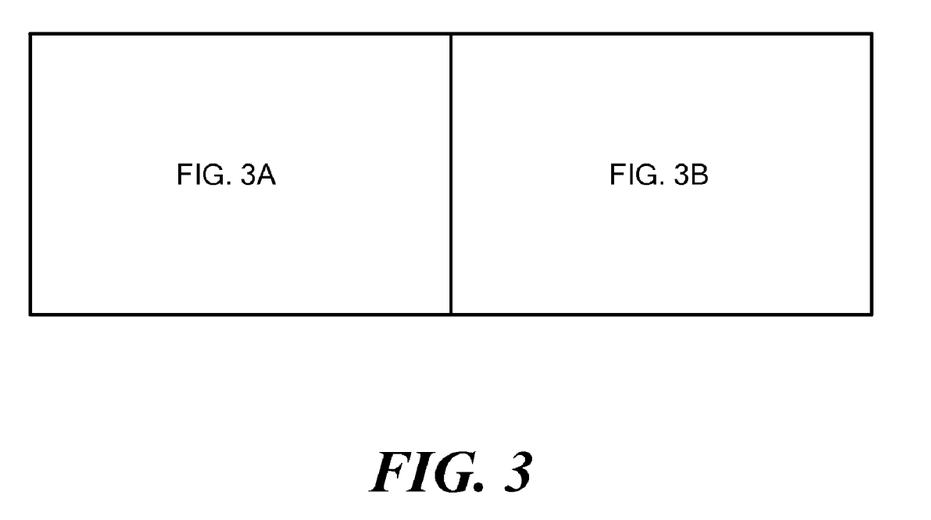
FIG. 3 is a block diagram of a voltage regulator, which can form a part of the system of FIGS. 1 and 2, having sequence component filtering in accordance with embodiments of the invention.
Figure 3A:
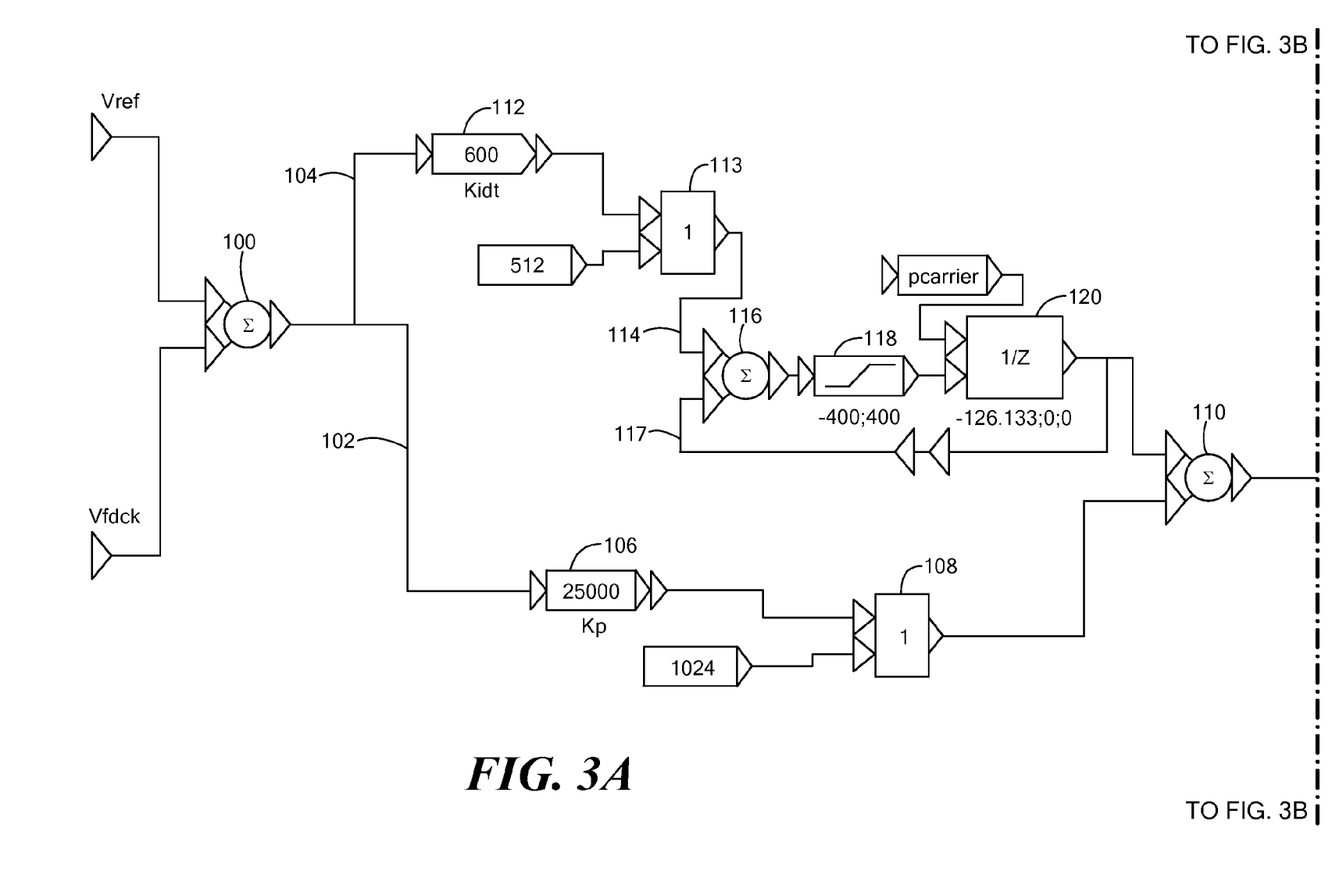
Figure 3B:
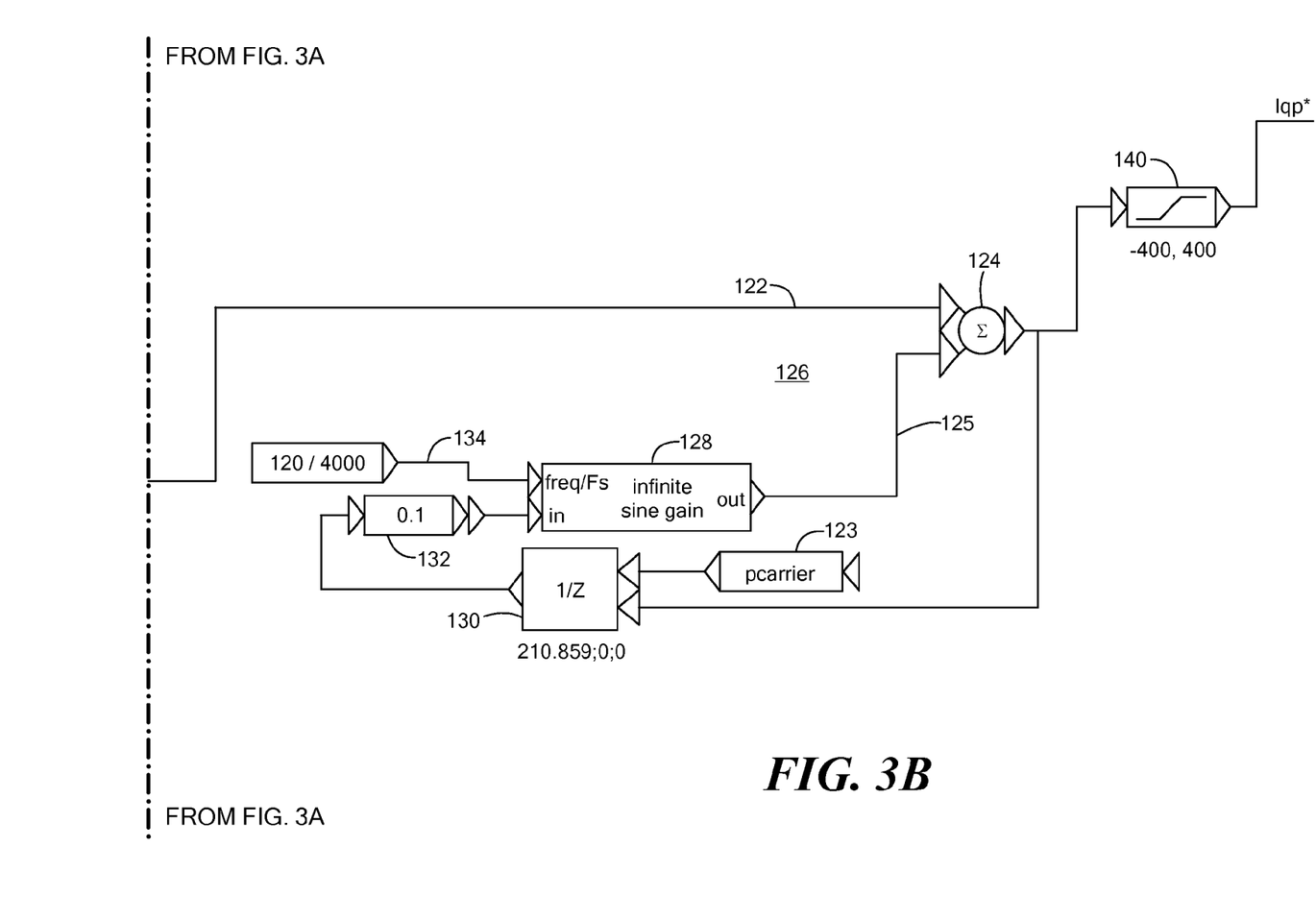

FIG. 3 shows further details of the voltage regulator 17 of FIGS. 1 and 2 providing 120 Hz ac component sequence component elimination. The voltage reference 60, e.g., 825V, and DC bus feedback signal are summed in a summer 100. The output of the summer 100 is provided to a proportional gain path 102 and an integral gain path 104. In the proportional gain path 102, the summer output is multiplied by a gain constant 106, shown as 25,000, and divided 108 by a further constant, shown as 1024, for scaling in software in an exemplary embodiment. The resultant value is provided as input to a summer 110.

In the integral gain path 104, the summer output has an integral gain 112, shown as 600, that is scaled by 512 in a divider 113 and the result is provided to a first input 114 of a summer 116. A feedback component provides a second input 117 to the summer 116. The summer 116 output is limited 118 and provided to a memory element 120. A pcarrier signal 123 is provided to the memory element with a frequency that determines the interval at which the voltage regulator operates.

The output from the memory element 120 is provided as the feedback signal at the second input 117 of the summer 116 and is also provided as an input to the proportional/integral path summer 110.

It can be seen that if a constant value is provided by the integral gain path 104 to the memory element 120 a continuously increasing value is generated. That is, the gain is essentially infinite for the integrator with respect to a DC input.

The output of the proportional/integral summer 110 is provided as a first input 122 to a summer 124. A second input 125 is provided to a negative input of the summer 124 as the output 125 from a generalized integrator 128, implementing a notch filter 126 that is effective to remove a 120 Hz sequence component.

The purpose of the filter is to remove the 120 Hz component from the output of the voltage regulator, which component is attributable to negative sequence components of inverter current or line voltage introducing these components into the DC bus and its feedback signal. By removing the 120 Hz component from the regulator output, inaccuracies in the current injected into or withdrawn from the line can be eliminated thereby enhancing the overall performance of the power system. Thus the inverter can independently control both positive and negative sequence components of current without interference from variations in DC bus voltage caused by negative sequence components and limited values of DC bus energy storage capability.

The illustrative filter 126 receives the summer 110 output as its input signal. The PI summer 110 output is coupled to a positive input of the summer 124, the negative input of which is provided as the output of a generalized integrator circuit 128. The output signal of the summer circuit 124 is fed back as the input to the generalized integrator 128 through a unit delay or memory element 130 and a feedback gain element 132. The unit delay element 130 is further responsive to a clock signal pcarrier for delaying the summer output 124 signal by one clock signal pulse or, in other words, for providing as its output signal the summer output signal occurring at the previous clock signal pulse. The pcarrier signal is the system clock signal, as noted above. The output signal of the gain element 132 is coupled to the input of the generalized integrator 128, as shown.

The generalized integrator 128 is further responsive to a frequency control signal 134, here shown as 120 divided by 4000, that sets the frequency to which the generalized integrator 128 and thus, the filter 126 are tuned. In the illustrative embodiment, the frequency control signal corresponds to the ratio of two times the frequency of the sampled current, or 120 Hz, to the system sampling rate of 4 KHz.

In one embodiment, the frequency control signal 134 is generated in response to a frequency estimate internal to the PLL 53 (FIGS. 1 and 2), as shown and described in the '827 patent. With this arrangement, the filter 126 can be characterized as a programmable notch filter, with the notch frequency programmable by the frequency control signal 134. Further, the PLL is self-regulating, or self-tuning since the tuned frequency changes in response to changes in the voltage processed by the PLL 53.

The generalized integrator 128 functions as an un-damped oscillator with substantially infinite gain at the tuned frequency. By infinite gain, it is meant that the amplitude of the output of the integrator increases in proportion to elapsed time without bound in response to any finite input at the tuned frequency. In the context of the filter circuit 126, the generalized integrator 128 generates an AC output signal 125 representing the component of the PI signal path at the tuned frequency of 120 Hz, which is subtracted by the summer 124. With this arrangement, the 120 Hz component of the PI path current signal is effectively removed.

The gain element 132 determines the dynamic response of the filter 126 and here, tuned for a lightly under-damped response. The output signal of the summer 124 is limited by a limiter 140 and output signal Igp* is provided to the current regulators 54, as shown in FIGS. 1 and 2.

The use of a generalized integrator is discussed in a paper by X. Yuan, et al. entitled "Stationary Frame Generalized Integrators for Current Control of Active Power Filters with Zero Steady State Error for Current Harmonics of Concern under Unbalanced and Distorted Operation Conditions" Conference Record of the 2000 IEEE IAS annual meeting, which is incorporated herein by reference. In contrast to a conventional integrator that has infinite gain at DC, the generalized integrator has infinite gain at a predetermined frequency. An exemplary implementation of a generalized integrator is shown and described in the '827 patent to Gritter.

As described above, the inventive voltage regulator removes 120 Hz sequence components from the DC bus that would otherwise be contained in the regulator output signal Iqp*. Conventional configurations lower the voltage regulator gain so that 120 Hz components are insignificant or use low pass filtering. However, these techniques slow the dynamic response to load imbalances. Another approach is to remove the 120 Hz component from the current regulator, however, this signal is needed to control the negative voltage sequence current thereby rendering this impractical. In a further approach, a significant amount of additional capacitance or other energy storage elements, at severe cost, could be provided for the DC bus to lessen the 120 Hz component effects.

While the voltage regulator is primary shown and described as having a proportional-integral configuration, it is understood that the regulator can also be provided as PID (proportional-integral-derivative), deadbeat, or other regulator type capable of feeding a notch filter.

Figure 3C:
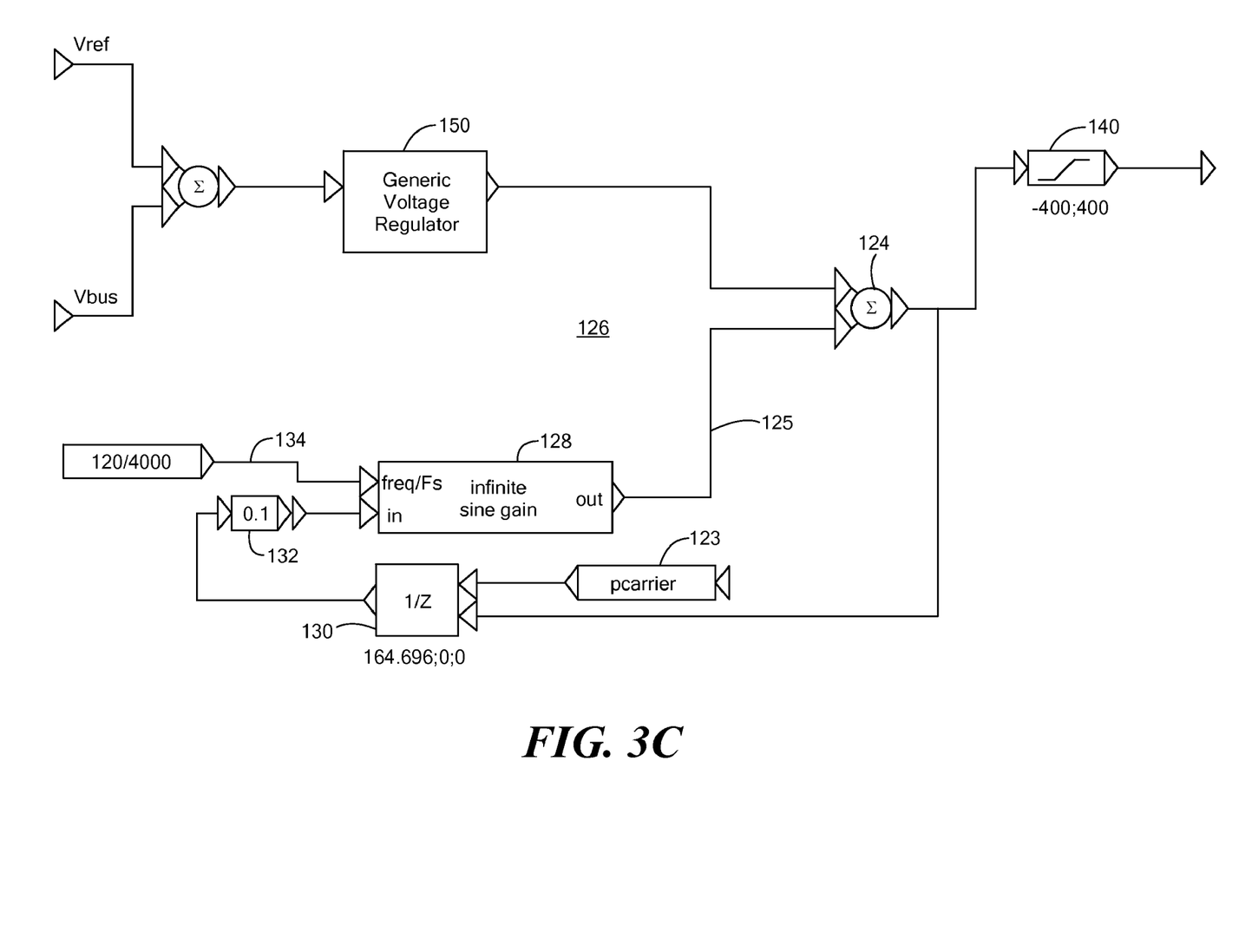
FIG. 3C is a further block diagram of a voltage regulator, which can form a part of the system of FIGS. 1 and 2, having sequence component filtering in accordance with embodiments of the invention.

For example, FIG. 3C shows a conventional voltage regulator 150 coupled to a notch filter 126 that is effective to remove a 120 Hz sequence component as described in detail above. In one embodiment, the notch filter 126 is substantially similar to the notch filter of FIG. 3 in which like reference numbers indicate like elements.

Figure 4A:
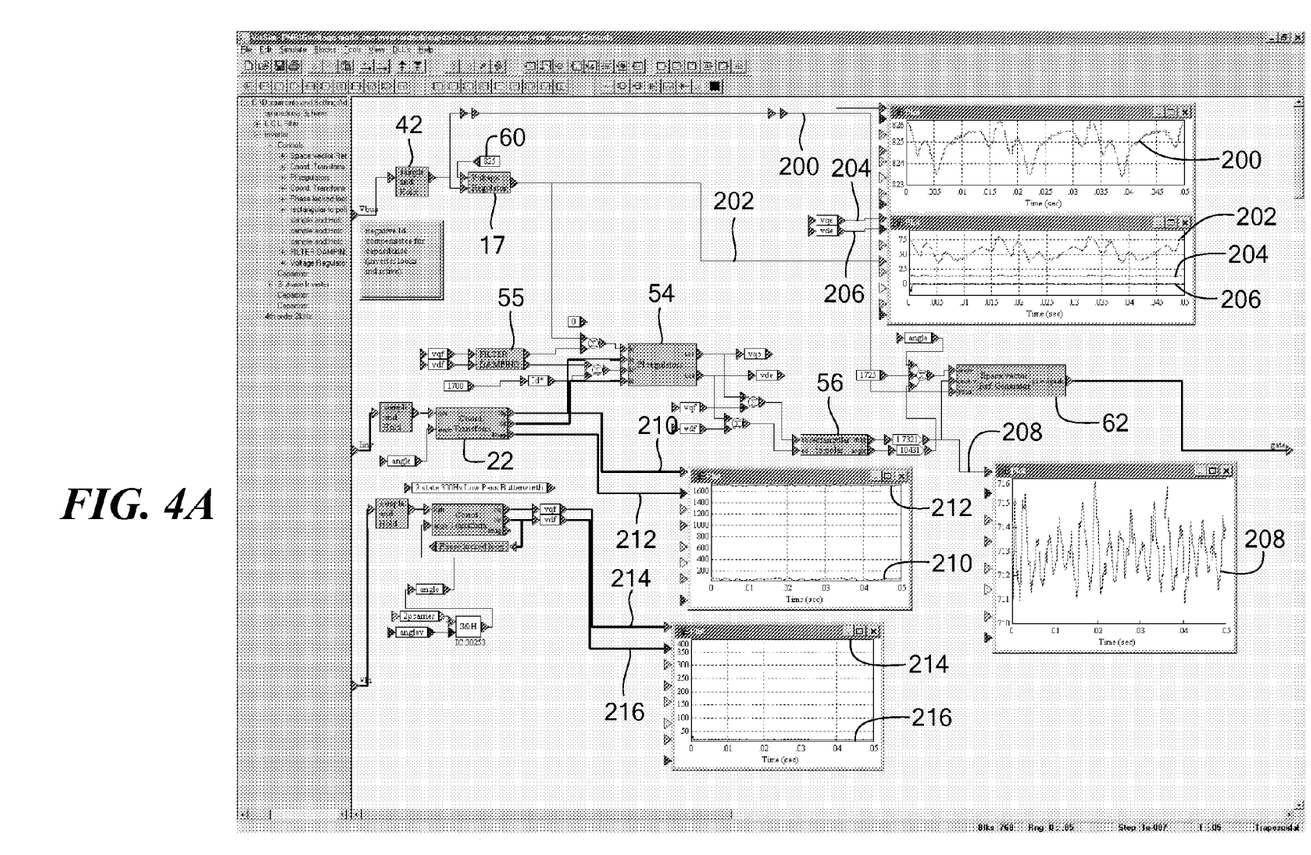
FIG. 4A is a block diagram of the system of FIG. 2 showing certain waveforms for normal operation.
Figure 4B:
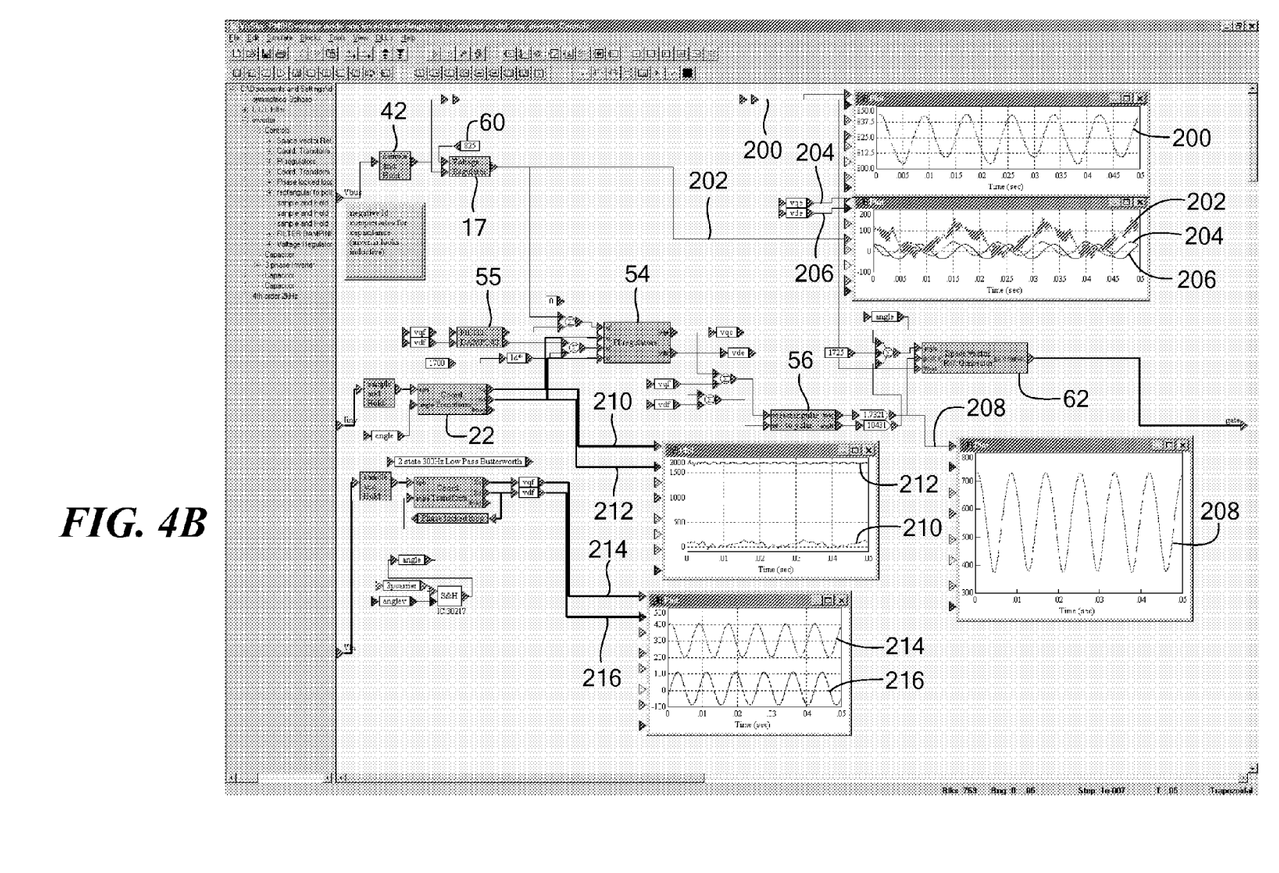
FIG. 4B is a block diagram of the system of FIG. 2 showing certain waveforms with the inventive voltage regulator filtering in the presence of unbalanced line voltages.
Figure 4C:
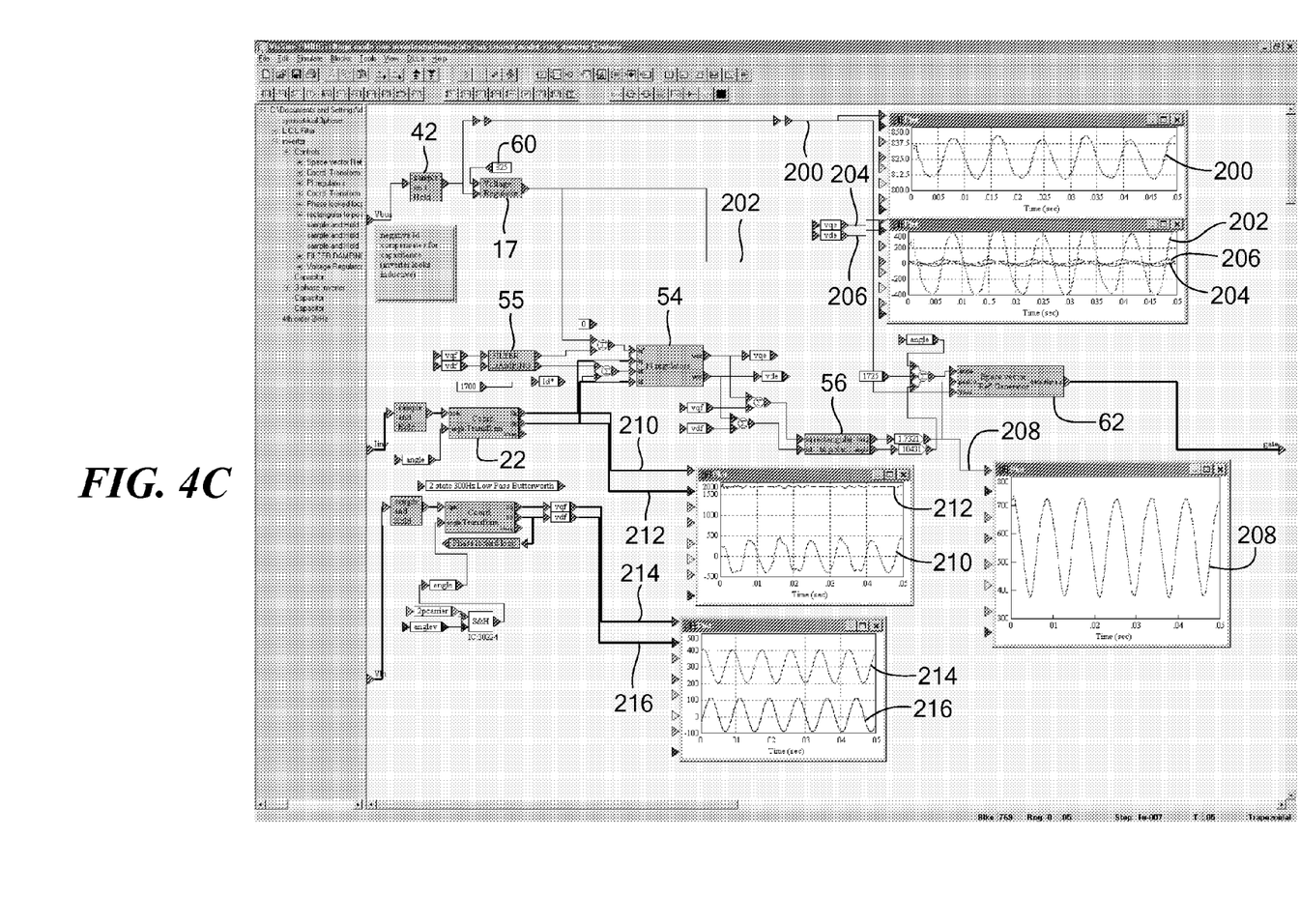
FIG. 4C is a block diagram of the system of FIG. 2 showing certain waveforms without the inventive voltage regulator filtering in the presence of unbalanced line voltages.

FIG. 4A shows various signals under normal operation (balanced line voltages), FIG. 4B shows the same signals (but under different scale possibly) in the presence of unbalanced line voltages with inventive filtering in the voltage regulator, and FIG. 4C shows the signals with unbalanced line voltages but without the inventive filtering in the voltage regulator. FIGS. 4A, 4B, and 4C generally show the system of FIG. 2, where like reference numbers indicate like elements.

The sampled Vbus voltage 200 shows a 120 Hz, approximately 50V peak to peak component in FIG. 4B due to the unbalanced line voltages. As described above, there is no correction made for this component. As shown in FIG. 4A, under normal operation the Vbus voltage stays within about 1V of the 825V reference voltage. FIG. 4C shows the same Vbus voltage as FIG. 4B.

The Iqp* component 202 that is output from the voltage regulator 17 is shown in normal operation in FIG. 4A. FIG. 4B shows the Iqp* signal with the 120 Hz removed and FIG. 4C (no filtering) shows the Iqp* signal containing the 120 Hz component. The vqe 204 and vde 206 components from the regulator module are also shown in FIGS. 4A, 4B, 4C.

Noting the scale, the magnitude signal 208 from the rectangular to polar converter 62 indicating the peak voltage is shown for each of normal operation (FIG. 4A), unbalanced line voltages with inventive voltage regulator filtering (FIG. 4B), and unbalanced line voltages without filtering (FIG. 4C). As can be seen, the magnitude is not impacted by the voltage regulator filtering to any significant extent, because the inverter in steady state needs to match its commanded voltage to its terminal voltage.

FIGS. 4A, 4B, and 4C also show the current sequence components Iq 210 and Id 212 from the current coordinate transformer and voltage components vqf 214 and vdf 216 from the voltage coordinate transformer. It should be noted that in FIG. 4A, the Id sequence component is at the reference level of 1700 and Iq is near zero.

It is understood that the power system 10 may take a variety of forms and serve a variety of purposes, such as power line conditioning, active rectification, etc. In power line conditioning, the inverter injects leading or lagging reactive power into the line in order to restore the line voltage to a desired level. To this end, the DC energy storage means sources or sinks energy as appropriate to smooth the DC bus while meeting the transient energy storage demands imposed by the inverter switching or modulation strategy. For active rectification, the inverter converts AC power into DC power to generate a regulated DC bus voltage, Vbus. It will be appreciated by those of ordinary skill in the art that the power system may take other forms as well, such as an active harmonic filter, a line condition monitor, a fault detector, an uninterruptible power supply feeding an unbalanced load, a flicker mitigation device and/or may combine functionality of different types of power systems.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A voltage regulator device for a power line, comprising:
   a first input terminal to receive a voltage signal for a DC bus and a second input terminal to receive a DC bus voltage reference signal;
   a proportional path and an integral path to receive the DC bus voltage information and the voltage reference signal information;
   a filter including a programmable notch filter tuned to a predetermined frequency that is twice a fundamental frequency of the power line to remove the predetermined frequency sequence components contained in the DC bus voltage signal; and
   an output terminal to provide an output of the voltage regulator device with the predetermined frequency sequence components removed to control an inverter coupled to the DC bus.

2. The device according to claim 1, wherein the notch filter is implemented as part of a phase locked loop.

3. The device according to claim 2, wherein a tuning parameter for the notch filter is derived from a frequency estimate of a phase locked loop locked to a positive sequence component of line voltage.

4. The device according to claim 1, wherein the filter includes the notch filter that includes a generalized integrator.

5. The device according to claim 1, further including a current regulator to receive the output of the voltage regulator device.

6. The device according to claim 5, further including a DC energy storage system coupled to the DC bus.

7. The device according to claim 6, further including a rectangular to polar converter and a space vector generator to generate gate signals to control the inverter.

8. The device according to claim 1, further including filtering DC bus ripple of about 50V.

9. The device according to claim 1, further including filtering DC bus ripple of about 50V at the predetermined frequency.

10. A control system for an AC power line voltage distribution system, comprising:
    a DC energy storage system;
    an inverter coupled to the DC energy storage system and adapted for coupling to the AC line distribution system;
    a modulator to provide control signals to the inverter; and
    a proportional-integral voltage regulator coupled to the DC energy storage system for receiving a voltage signal from the DC energy storage system and adapted for coupling to a voltage reference, the voltage regulator including:
    a proportional path and an integral path to receive the DC voltage information and the voltage reference signal information;
    a filter including a programming notch filter tuned to a predetermined frequency that is twice a fundamental frequency of the power line to remove the predetermined frequency sequence components contained in the DC bus voltage signal; and
    an output terminal to provide an output of the voltage regulator with the sequence components removed for input to a current regulator for generating control signals to control the inverter.

11. The system according to claim 10, wherein the notch filter is implemented as part of a phase locked loop.

12. The system according to claim 11, wherein a tuning parameter for the notch filter is derived from a frequency estimate of a phase locked loop locked to a positive sequence component of line voltage.

13. The system according to claim 10, wherein the notch filter includes a generalized integrator.

14. A method, comprising:
    receiving a voltage on a DC bus;
    receiving a reference voltage;
    processing the DC bus voltage and the reference voltage in a proportional path of a voltage regulator;
    processing the DC bus voltage and the reference voltage in an integral path of the voltage regulator;
    combining an output of the proportional path and an output of the integral path and removing, using a programmable notch filter tuned to a predetermined frequency that is twice a fundamental frequency of the power line, predetermined frequency sequence components from the combined proportional path output and the integral path output; and
    generating an output control signal with an ac component removed to control an inverter coupled to the DC bus.

15. The method according to claim 14, further including removing the ac component with the notch filter in a phase locked loop.

16. The method according to claim 15, further including using a generalized integrator in the phase locked loop.

17. The method according to claim 14, further including providing the output control signal to a current regulator.

18. The method according to claim 14, further including using output control signal to generate gate signals for the inverter.

19. The method according to claim 18, further including using the inverter to enhance performance of an AC line distribution system.

* * * * *